United States Patent [19]
Bannai et al.

[11] Patent Number: 5,855,112
[45] Date of Patent: Jan. 5, 1999

[54] GAS TURBINE ENGINE WITH RECUPERATOR

[75] Inventors: Takashi Bannai; Tsuneo Endou; Masahiko Izumi; Ken Ohya, all of Saitama, Japan

[73] Assignee: Honda Giken Kogyo Kabushiki Kaisha, Tokyo, Japan

[21] Appl. No.: 875,306
[22] PCT Filed: Aug. 2, 1996
[86] PCT No.: PCT/JP96/02179
§ 371 Date: Mar. 30, 1998
§ 102(e) Date: Mar. 30, 1998
[87] PCT Pub. No.: WO97/09524
PCT Pub. Date: Mar. 13, 1997

[30] Foreign Application Priority Data

Sep. 8, 1995 [JP] Japan .................................. 7-230911
Feb. 29, 1996 [JP] Japan .................................. 8-043567

[51] Int. Cl.[6] ................................................... F02C 7/08
[52] U.S. Cl. ...................................................... 60/39.511
[58] Field of Search ........................... 60/39.36, 39.511, 60/39.512; 165/4

[56] References Cited

U.S. PATENT DOCUMENTS

| 2,553,867 | 5/1951 | Parducci ............................ 60/39.511 |
|---|---|---|
| 3,818,984 | 6/1974 | Nakamura et al. ................ 165/166 |
| 3,831,374 | 8/1974 | Nicita ................................ 60/39.51 |
| 4,141,212 | 2/1979 | Koschier .......................... 60/39.511 |
| 4,213,297 | 7/1980 | Forster ............................. 60/39.511 |
| 5,004,044 | 4/1991 | Horgan et al. ................... 165/145 |

FOREIGN PATENT DOCUMENTS

| 47-7453 | 4/1972 | Japan . |
| 58-4172 | 1/1983 | Japan . |
| 58-55331 | 9/1983 | Japan . |

Primary Examiner—Louis J. Casaregola
Attorney, Agent, or Firm—Lyon & Lyon LLP

[57] ABSTRACT

A gas turbine engine E includes a compressor wheel 9 and a turbine wheel 10 fixed to a rotary shaft 8, a can-type combustor 18 disposed on an extension of the axis L of the rotary shaft 8, and an circular plate-type heat exchanger 12 disposed to surround a radially outer portion of the can-type combustor 18. The compressor wheel 9, the turbine wheel 10, the can-type combustor 18 and the plate-type heat exchanger 12 are disposed coaxially with the axis L of the rotary shaft 8. Therefore, the flows of compressed air and combustion gas are symmetrized with respect to the axis L, and the distribution of temperature within a casing is also symmetrized with respect to the axis L. Thus, the flows of compressed air and combustion gas within the gas turbine engine E can be axially symmetrized, and the generation of a thermal distortion can be prevented.

6 Claims, 9 Drawing Sheets

GAS TURBINE ENGINE WITH RECUPERATOR

BACKGROUND OF THE INVENTION

The present invention relates to a gas turbine engine in which air compressed in a compressor wheel driven by a turbine wheel and then heated in a heat exchanger is mixed with fuel; the resulting air-fuel mixture is burnt in a combustor, and a generated combustion gas is utilized for the driving of the turbine wheel and the heat exchange in the heat exchanger.

BACKGROUND ART

Such a gas turbine engine is already known, for example, from Japanese Patent Publication Nos. 58-4172 and 58-55331 and Japanese Patent Application Laid-open No. 47-7453.

The above known gas turbine engine suffers from a problem that the flow of the compressed air and the combustion gas is liable to be circumferentially non-uniformized to generate a pressure loss, because the heat exchanger is disposed non-symmetrically about an axis, or is of a rotary type, or the combustor is disposed non-symmetrically about an axis. In addition, a higher-temperature section contacting with the combustion gas and a lower-temperature section contacting with the compressed air exist non-symmetrically within a casing. For this reason, there is a possibility that a thermal distortion may be generated by a difference between amounts of engine portions thermally expanded, thereby causing a disadvantage that the rotary shaft is flexed to impede the smooth rotation of the compressor wheel and the turbine wheel, or to damage the brittle ceramic parts.

SUMMARY OF THE INVENTION

Accordingly, it is an object of the present invention to suppress the pressure loss and the thermal distortion within the gas turbine engine to the minimum.

To achieve the above object, according to a first aspect and feature of the present invention, there is provided a gas turbine engine comprising a can-type combustor, a compressor wheel adapted to supply compressed air to the can-type combustor, a turbine wheel driven by a combustion gas generated in the can-type combustor for driving the compressor wheel, and a circular plate-type heat exchanger for conducting the heat exchange between the combustion gas discharged from the turbine wheel and the compressed air to be supplied to the can-type combustor, wherein the compressor wheel, the turbine wheel, the can-type combustor and the plate-type heat exchanger are disposed coaxially; the plate-type heat exchanger is disposed at a location radially outside the can-type combustor and axially offset from the compressor wheel and the turbine wheel; and a compressed-air passage for guiding the compressed air from the compressor wheel to the plate-type heat exchanger and a combustion gas passage for guiding the combustion gas from the turbine wheel to the plate-type heat exchanger are disposed radially outside the compressor wheel and the turbine wheel.

With such arrangement, the compressor wheel, the turbine wheel, the can-type combustor and the plate-type heat exchanger are disposed coaxially and therefore, the flows of the compressed air and the combustion gas within the engine can be axially symmetrized to decrease the pressure loss and achieve an increase in output power and a reduction in fuel consumption. In addition, the distribution of temperature within the engine can be axially symmetrized to suppress the generation of a thermal distortion to the minimum; to assure the smooth rotation of the compressor wheel and the turbine wheel, and to avoid the damage to the parts due to an ununiform thermal expansion. Moreover, the casing and the duct can be made from a thin material and axially symmetrized, thereby not only achieving a reduction in weight, but also decreasing the heat loss at the cold start by a decrease in heat mass to further reduce the fuel consumption. The plate-type heat exchanger is disposed at the location radially outside the can-type combustor and axially offset from the compressor wheel and the turbine wheel, and the compressed-air passage for guiding the compressed air from the compressor wheel to the plate-type heat exchanger and the combustion gas passage for guiding the combustion gas from the turbine wheel to the plate-type heat exchanger are disposed radially outside the compressor wheel and the turbine wheel. Therefore, the plate-type heat exchanger and the compressed-air passage and the combustion gas passage for guiding the compressed air and the combustion gas to the plate-type heat exchanger can be axially laid out rationally to reduce the radial dimension of the engine.

According to a second aspect and feature of the present invention, in addition to the first feature, an oxidizing catalyst is incorporated in the combustion gas passage.

With such arrangement, the combustion gas can be purified while suppressing the increase in radial dimension of the engine to the minimum due to the mounting of the oxidizing catalyst.

According to a third aspect and feature of the present invention, in addition to the first feature, the compressed air and the combustion gas flow in opposite directions within the plate-type heat exchanger.

With such arrangement, the heat exchange efficiency of the plate-type heat exchanger can be enhanced.

According to a fourth aspect and feature of the present invention, in addition to the first feature, the can-type combustor includes a pre-mixing zone, a catalytic combustion zone, and a homogeneous combustion zone.

With such arrangement, an air-fuel-mixture resulting from the uniform mixing of fuel and the compressed air in the pre-mixing zone can be burnt at a low temperature by the catalyst to reduce the amount of noxious components in the combustion gas.

According to a fifth aspect and feature of the present invention, in addition to the first feature, the can-type combustor includes a pre-mixing zone, a flame holder zone, and a homogeneous combustion zone.

With such arrangement, the fuel and the compressed air can be uniformly mixed in the pre-mixing zone to reduce the amount of noxious components in the combustion gas.

According to a sixth aspect and feature of the present invention, in addition to the first feature, a pre-heating means is incorporated in the compressed-air passage which connects the plate-type heat exchanger and the can-type combustor.

With such arrangement, the compressed air can be pre-heated at the start to enhance the startability.

BRIEF DESCRIPTION OF THE DRAWINGS

FIGS. 1 to 7 illustrate a first embodiment of the present invention, wherein FIG. 1 is a vertical sectional view of a gas turbine engine;

FIG. 2 is an enlarged sectional view taken along a line 2—2 in FIG. 1;

FIG. 3 is a map indicating the relationship between the portions of the gas turbine engine shown in FIGS. 4—6;

FIG. 4 is an enlarged view of a portion A in FIG. 3;

FIG. 5 is an enlarged view of a portion B in FIG. 3;

FIG. 6 is an enlarged view of a portion C in FIG. 3; and

FIG. 7 is an enlarged view of an essential portion shown in FIG. 5;

FIGS. 8 and 9 illustrate a second embodiment of the present invention, wherein

FIG. 8 is a vertical sectional view of a gas turbine engine; and

FIG. 9 is a view similar to FIG. 6.

DETAILED DESCRIPTION OF THE EMBODIMENTS OF THE INVENTION

First, the basic structure of a gas turbine engine E according to a first embodiment of the present invention will be described with reference to FIGS. 1 and 2.

Figure 1:
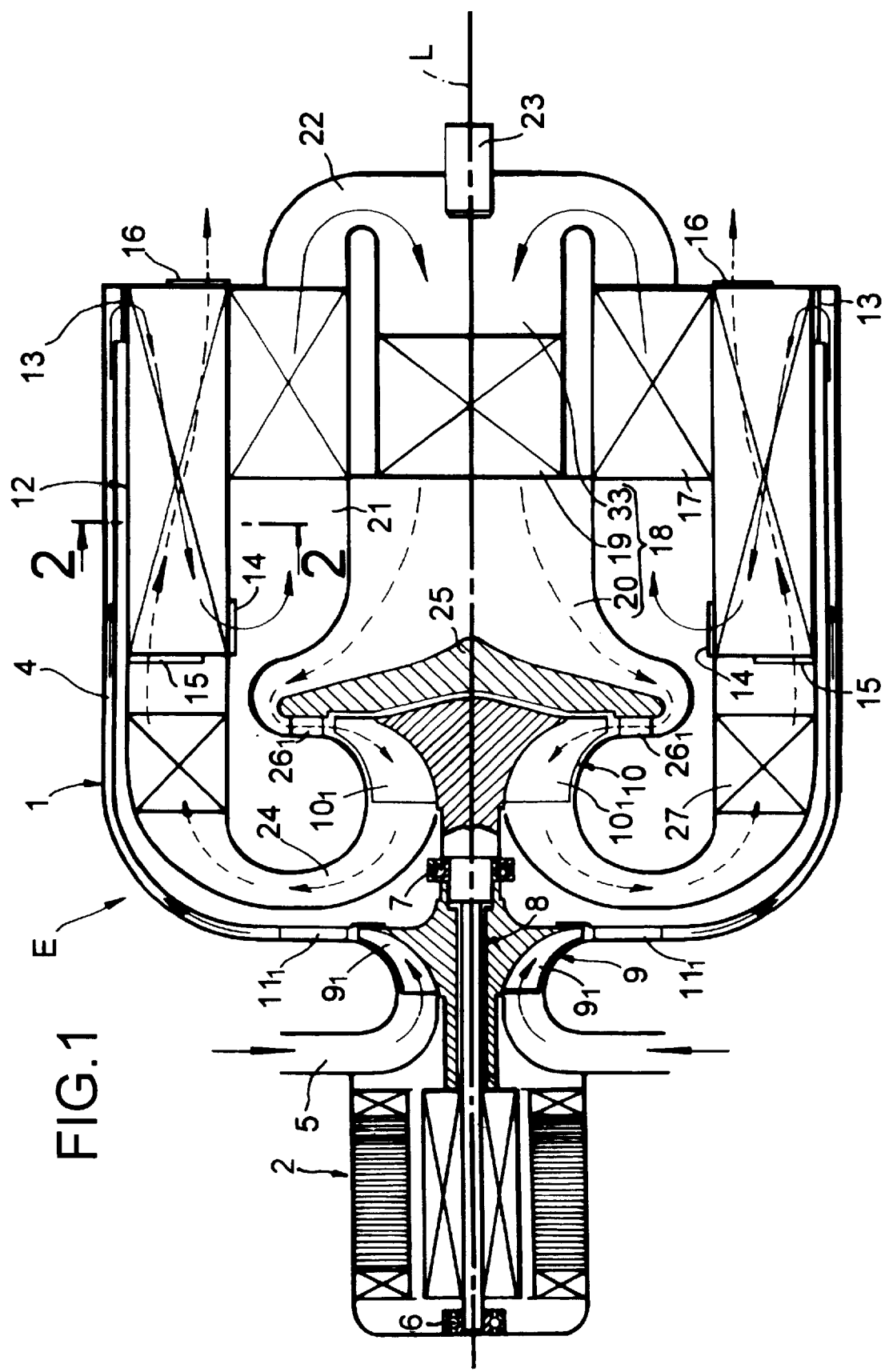

As shown in FIG. 1, the gas turbine engine E includes an engine casing 1 formed into a substantially cylindrical shape. A first compressed-air passage 4 is defined around an outer periphery of the engine casing 1, and an intake passage 5 connected to an air cleaner and a silencer (not shown) is connected to an upstream portion of the first compressed-air passage 4.

A centrifugal compressor wheel 9 and a centrifugal turbine wheel 10 are coaxially fixed, adjacent to each other, to a rotary shaft 8 which is passed through a central portion of the intake passage 5 and supported on a pair bearings 6 and 7. The rear bearing 7 is disposed between the compressor wheel 9 and the turbine wheel 10 and hence, the amount of turbine wheel 10 protruding rearwards from the bearing 7 can be decreased to alleviate the vibration, as compared with the case where the bearing 7 is disposed in front of the compressor wheel 9. A plurality of compressor blades $9_1$ are radiately formed around an outer periphery of the compressor wheel 9 to face the intake passage 5, and a plurality of compressor diffusers $11_1$ are provided in the first compressed-air passage 4 located immediately downstream from the compressor blades $9_1$. A dynamo 2 is mounted at a front end of the rotary shaft 8 and is driven by the turbine wheel 10.

A circular plate-type heat exchanger 12 is disposed at a rear end of the engine casing 1. The plate-type heat exchanger 12 includes a compressed-air inlet 13 at a location near an outer periphery at a rear end thereof, a compressed-air outlet 14 at a location near an inner periphery at a front end thereof, a combustion gas inlet 15 at a location near the outer periphery at the front end thereof, and a combustion gas outlet 16 at a location near the inner periphery at the rear end thereof.

Figure 2:
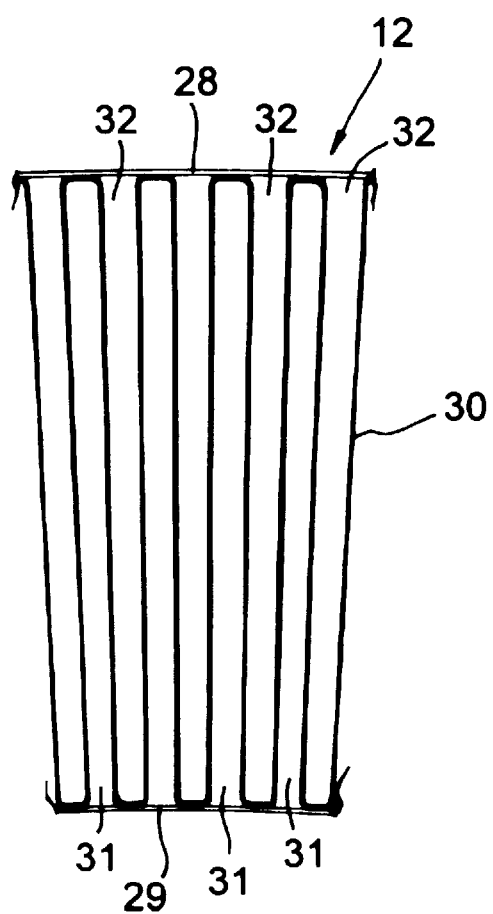
Figure 3:
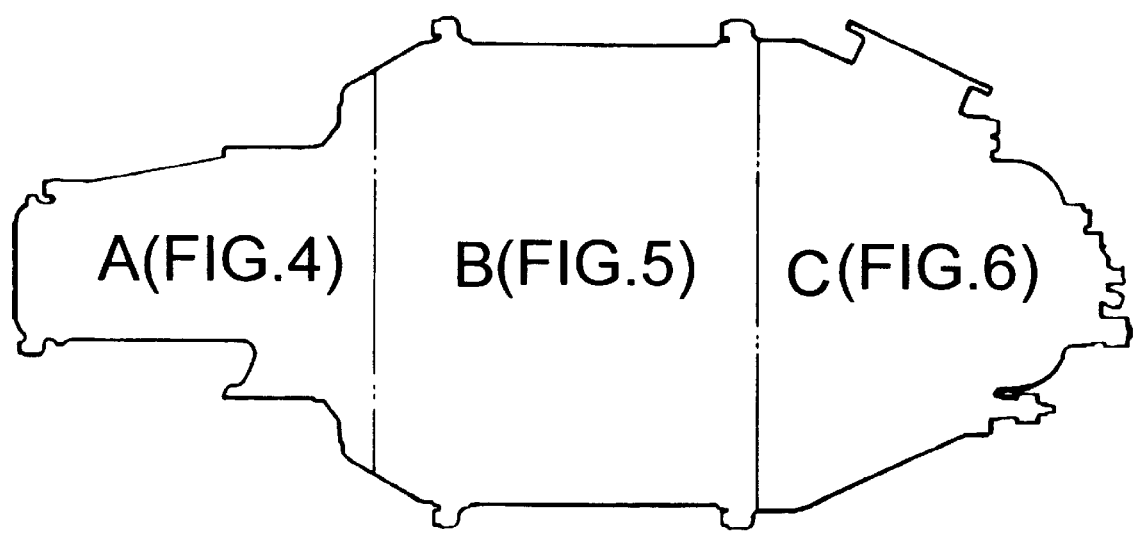

As can be seen from FIG. 2, the plate-type heat exchanger 12 includes a cylindrical larger-diameter outer housing 28 and a cylindrical smaller-diameter inner housing 29 which are coupled to each other by a heat transfer plate 30 made by folding a metal plate in a zigzag manner. Compressed-air flow passages 31 and combustion gas flow passages 32 are alternately defined with the heat transfer plate 30 sandwiched therebetween.

By allowing compressed air of a relatively low temperature shown by a solid line and a combustion gas of a relatively high temperature shown by a dashed line to flow in mutually opposite directions, as shown in FIG. 1, a difference in temperature between the compressed air and the combustion gas can be maintained at a large value over the entire length of the flow passages, thereby enhancing the heat exchange efficiency.

A circular pre-heater 17 is coaxially disposed radially inside the plate-type heat exchanger 12, and further, a can-type catalytic combustor 18 is coaxially disposed radially inside the pre-heater. The can-type combustor 18 includes a pre-mixing zone 33, a catalytic combusting zone 19 and a homogeneous combusting zone 20 in sequence from an upstream side to a downstream side. The compressed-air outlet 14 of the plate-type heat exchanger 12 and the pre-heater 17 are interconnected by a second compressed-air passage 21, and the pre-heater 17 and the pre-mixing zone 33 are interconnected by a third compressed-air passage 22. A fuel injection nozzle 23 is provided in the third compressed-air passage 22. A fuel injected from the fuel injection nozzle 23 is uniformly mixed in the pre-mixing zone 33 with the compressed air for a combustion which produces a less amount of noxious exhaust substances. By employing the can-type combustor 18 in the above manner, it is possible not only to achieve a catalytic combustion which is difficult in an circular-type combustor, but also to reduce the number of the fuel injection nozzles 23 and the like to provide a simplification of the structure.

A plurality of turbine blades 101 are radiately formed around an outer periphery of the turbine wheel 10 to face an upstream portion of a combustion gas passage 24 which interconnects the homogeneous combustion section 20 and the combustion gas inlet 15 in the plate-type heat exchanger 12, and a heat shield plate means 25 and turbine nozzles $26_1$, for guiding the combustion gas from the homogeneous combustion zone 20 are mounted further upstream of the turbine blades $10_1$. A circular oxidizing catalyst 27 for removing noxious components in the combustion gas is disposed at a location downstream from the combustion gas passage 24.

The structure of the gas turbine engine E will be described below in further detail with reference to FIGS. 3 to 7.

The engine casing 1 is comprised of a front cover 41, a front bearing casing 42, a dynamo housing 43, a front casing 44, an outer casing 45, a rear casing 46 and a rear cover 47 which are sequentially coupled from the front toward the rear of the gas turbine engine E. The front cover 41 and the front bearing casing 42 are coupled to each other by bolts 48. The front bearing casing 42 and the dynamo housing 43 are coupled to each other by bolts 49, and the dynamo housing 43 and the front casing 44 are coupled to each other by bolts 50.

The front casing 44 and the outer casing 45 are coupled to each other by bolts 52 in a state in which flanges $44_1$, and $45_1$, formed on respective end faces thereof are in abutment against each other with a resilient seal 51 interposed therebetween. The outer casing 45 and the rear casing 46 are coupled to each other by bolts 54 in a state in which a circular mounting bracket 53 fixed to an outer periphery of the plate-type heat exchanger 12 has been clamped between flanges $45_2$ and $46_1$ formed on respective end faces thereof. At this time, a resilient seal 55 is interposed between the flange $45_2$ of the outer casing 45 and the mounting bracket 53 of the plate-type heat exchanger 12.

A rear end face of the rear casing 46 and a flange $47_1$, formed on a front end face of the rear cover 47 are put into abutment against each other and coupled to each other by bolts 56. At this time, a flange $57_1$, of a cylindrical member 57 affixed to the flange $47_1$ in order to prevent the leakage of high-pressure air into an exhaust duct is commonly coupled to the plate-type heat exchanger 12 by the bolts 56, and a flange $17_1$, integrally formed on the pre-heater 17 is coupled to the flange $47_1$, of the rear cover 47 by bolts 58. The member 57 affixed to the plate-type heat exchanger 12 in order to prevent the leakage of high-pressure air into the exhaust duct includes bellows-like ridges $57_2$. Thus, the deformation of the ridges $57_2$ permits an axial heat-expansion of the plate-type heat exchanger 12.

A cylindrical mixing duct 59 of the can-type combustor 18 is coupled at its rear end to a flange $47_2$ formed on a rear end face of the rear cover 47 by bolts 60, and the fuel injection nozzle 23 is also coupled to the flange $47_2$ by bolts 61.

Figure 4:
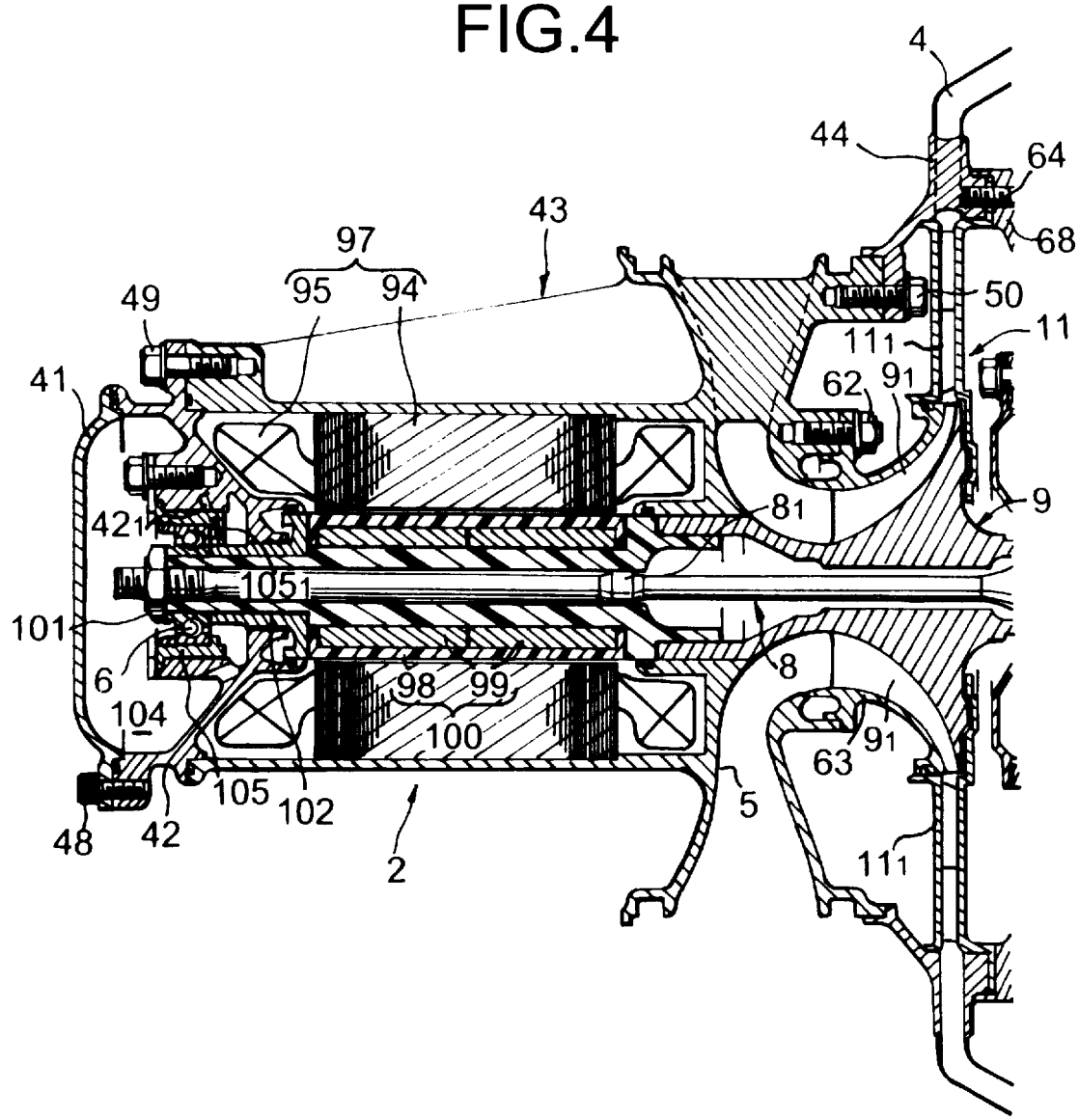

As can be seen from FIG. 4, the intake passage 5 integrally defined at the rear end of the dynamo housing 43 communicates with the first compressed-air passage 4 defined around the outer periphery of the front casing 44 through the inside of the compressor shroud 63 that is coupled to the dynamo housing 43 by bolts 62 and the inside of the compressor diffuser housing 11 coupled to an inner surface of the front casing 44 by bolts 64. As can be seen from FIGS. 5 and 6, a portion of the first compressed-air passage 4 defined around the front casing 44 communicates with the compressed-air inlet 13 of the plate-type heat exchanger 12 through portions of the first compressed-air passage 4 defined around outer peripheries of the outer casing 45 and the rear casing 46. Circular reinforcing members 65, 65 for enhancing the anti-buckling strength are mounted to an inner periphery of the first compressed-air passage portion 4 around the outer casing 45. An exhaust duct 66 is provided in the rear casing 46.

Figure 5:
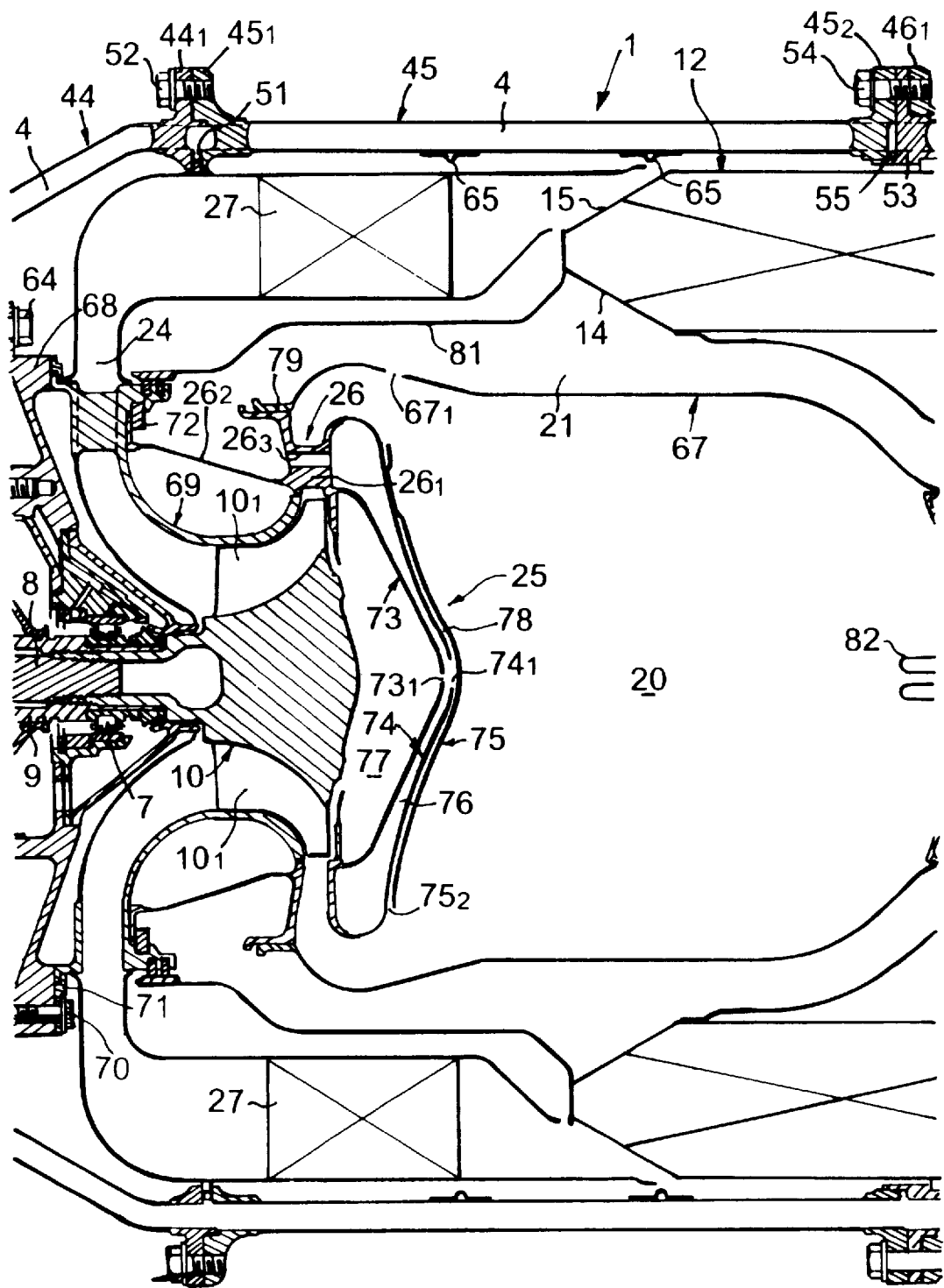

As can be seen from FIG. 5, the second compressed-air passage 21 connected to the compressed-air outlet 14 of the plate-type heat exchanger 12 diverges forwards and rearwards, so that most of the compressed air is diverted rearwards and supplied to the pre-heater 17, and a portion of the compressed air is diverted forwards and supplied as diluting-air to the homogeneous combustion zone 20 via through-holes 67, defined in the combustor duct 67 which constitutes an outer wall of the homogeneous combustion zone 20 of the can-type combustor 18.

Figure 7:
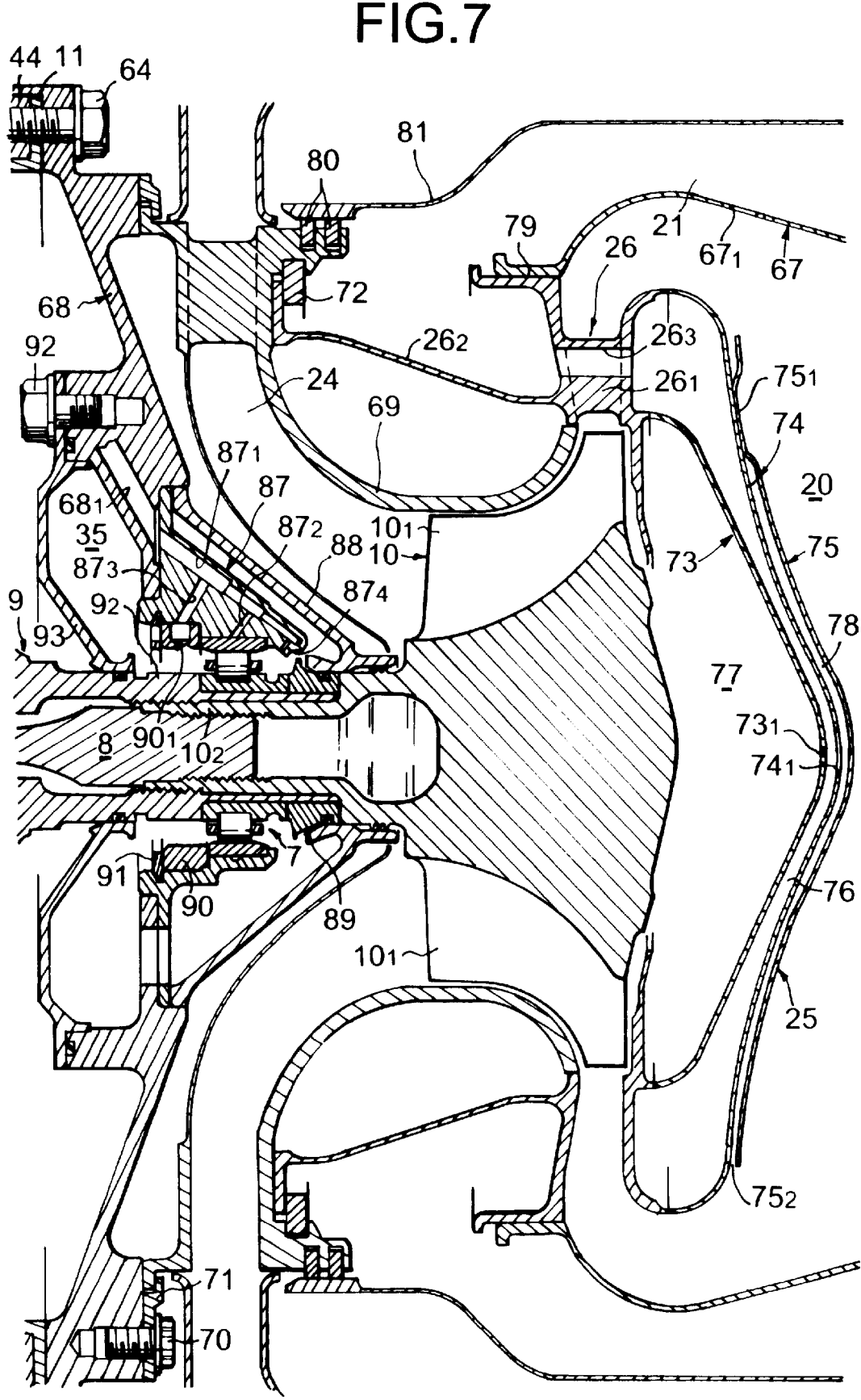

As can be seen from FIG. 7, an outer periphery of a rear bearing housing 68 is commonly coupled by bolts 64 which couple the compressor diffuser housing 11 to the inner surface of the front casing 44. A turbine shroud 69 is placed into abutment against a rear end of the rear bearing housing 68 and fixed by a fixing member 71 which is fastened to the rear bearing housing 68 by bolts 70. A mounting leg $26_2$ extending forwards from a turbine back shroud 26 integrally provided with the turbine nozzles $26_1$, is coupled to a rear surface of the turbine shroud 69 by a clip 72.

The heat shield plate means 25 covering a rear portion of the turbine wheel 10 is comprised of a dish-like first heat shield plate 73 fixed to the rear surface of the turbine back shroud 26, a dish-like second heat shield plate 74 fixed to the rear surface of the turbine back shroud 26, and a third heat shield plate 75 disposed at a predetermined gap left from a rear surface of the second heat shield plate 74 and fixed at a plurality of circumferential points $75_1$. The second compressed-air passage 21 diverging forwards from the compressed-air outlet 14 of the plate-type heat exchanger 12 communicates with a first cooling space 76 defined between the first and second heat shield plates 73 and 74 through through-holes $26_3$ extending through the inside of the turbine nozzles $26_1$, formed in the turbine shroud 26. The first cooling space 76 communicates with a second cooling space 77 defined between the first heat shield plate 73 and the turbine wheel 10 through a through-hole $73_1$, defined in the first heat shield plate 73, and also communicates with a third cooling space 78 defined between the second and third heat shield plates 74 and 75 through a through-hole $74_1$ defined in the second heat shield plate 74.

During operation of the gas turbine engine E, the heat shield means 25 opposed to the homogeneous combustion zone 20 is subjected to a high temperature. However, the relatively low-temperature compressed air passed through the plate-type heat exchanger 12 is diverted forwards in the second compressed-air passage 21, and as shown in FIG. 7, flows through the through-holes $26_3$ in the turbine back shroud 26 into the first cooling space 76 and then, from the first cooling space 76 via the through-hole $74_1$, in the second heat shield plate 74, through the third cooling space 78 and openings $75_2$ into the homogeneous combustion zone 20, on the one hand, and from the first cooling space 76 via the through-hole $73_1$, in the first heat shield plate 73 through the second cooling space 77 into the turbine wheel 10, on the other hand. In this manner, the first, second and third heat shield plates 73, 74 and 75 can be effectively cooled by the contact with the relatively low-temperature compressed air.

As can be seen from FIG. 7, the turbine back shroud 26 and the combustor duct 67 slidably abut against each other at a sealing area 79, and the axial thermal expansion is absorbed by the sliding movements of the turbine back shroud 26 and the combustor duct 67 in the sealing area 79. In addition, two seal rings 80, 80 mounted to an outer periphery of the turbine shroud 69 slidably abut against a front end of a second compressed-air passage duct 81 which defines a portion of the second compressed-air passage 21, so that the axial thermal expansion can be absorbed while preventing the leakage of the compressed air, by the seal rings 80, 80. Each of the seal rings 80 has a single slit and is tensioned in an expanding direction, and has a structure similar to that of a piston ring in a gasoline engine.

Figure 6:
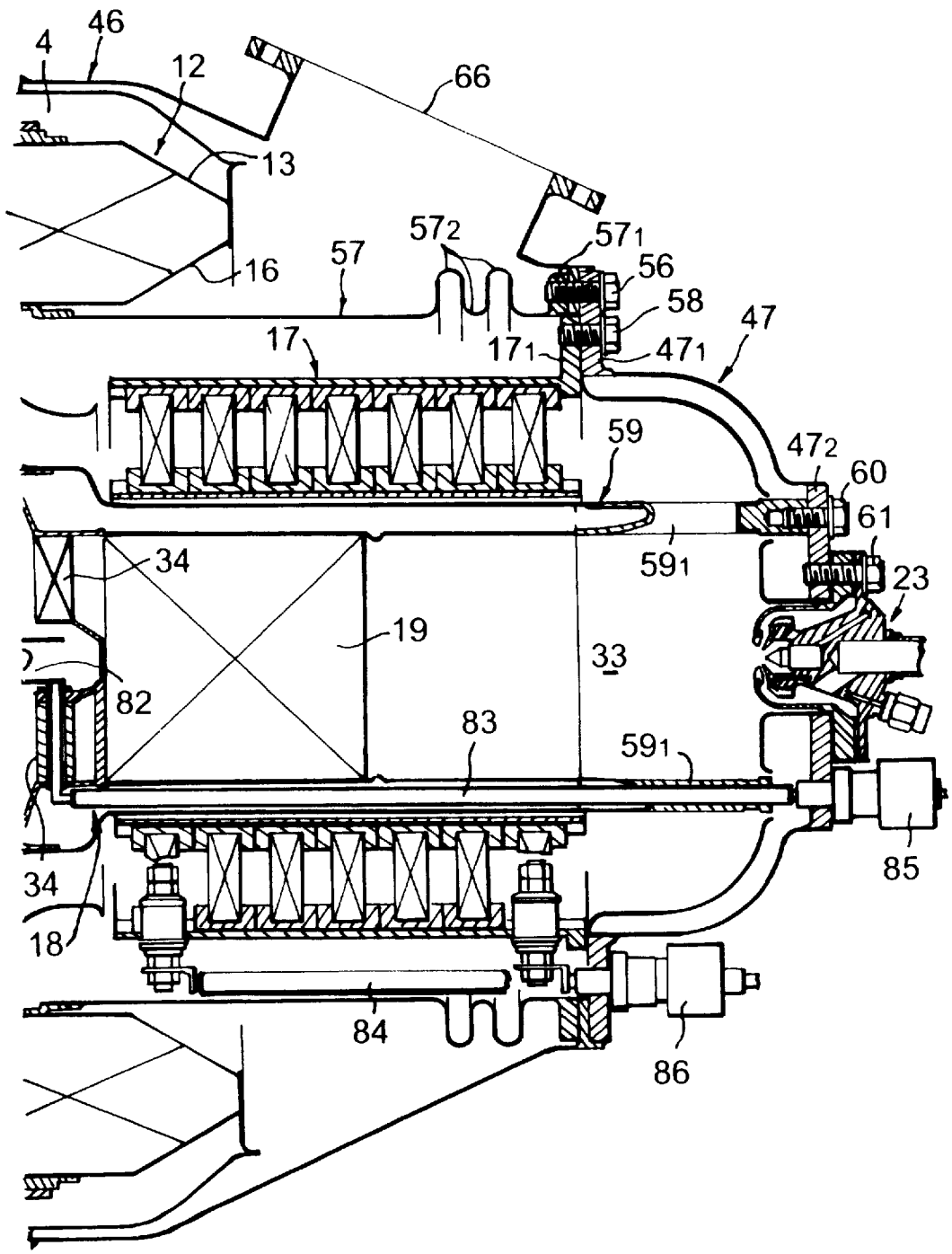

As can be seen from FIG. 6, mixers $59_1$, are formed in an inlet of the mixing duct 59 for generating a swirl in the compressed air to promote the mixing with the fuel, when the compressed air passed through the pre-heater 17 is guided to the premixing zone 33 in the can-type combustor 18. A flame holder zone 34 for generating a swirl in an air-fuel mixture and a starting ignition heater 82 are provided in an outlet of the catalytic combustion zone 19. The energization of the ignition heater 82 is carried out through a cable 83 which extends from the rear cover 47 into the mixers $59_1$ and the inside of the mixing duct 59. The energization of the pre-heater 17 is carried out through a cable 84 which extends from the rear cover 47 along an inner surface of the affixed member 57. The cables 83 and 84 are connected the outside of the rear cover 47 through insulating fittings 85 and 86.

As can be seen from FIG. 7, an outer periphery of a bearing holder 87 and an outer periphery of a rear lubricating chamber cover 88 are fitted and retained on an inner periphery of the rear bearing housing 68. A rear end of the rotary shaft 8 is coaxially threadedly fitted into a coupling portion $10_2$ at a front end of the turbine wheel 10, and a coupling portion $9_2$ at a rear end of the compressor wheel 9 is coaxially threadedly fitted over an outer periphery of the coupling portion $10_2$, whereby the turbine wheel 10 and the compressor wheel 9 are coupled to the rotary shaft 8. A front end of an inner race of the bearing 7 is supported in abutment against a step of the coupling portion $9_2$ of the compressor wheel 9, and a rear end thereof is supported in abutment against a step of the coupling portion $10_2$ of the turbine wheel 10. On the other hand, an outer race of the bearing 7 is supported at its front end on the bearing holder 87 with a collar 90 and a clip 91 interposed therebetween and at its rear end on a step of the bearing holder 87. The bearing 7 is supported in a floating manner with a slight gap left for the damping purpose. A lubricating oil chamber 35 is defined by a front lubricating chamber cover 93 fixed by a bolt 92 to a front surface of the rear bearing housing 68 and the above-described rear lubricating chamber cover 88.

Thus, a lubricating oil supplied through oil passages $68_1$ and $87_1$, defined in the rear bearing housing 68 and the bearing holder 87 pushes the outer race of the bearing 7 radially inwards through an oil passage $87_2$, thereby permitting the bearing 7 supported in the floating manner to have a vibration damping function. An oil passage $87_3$ diverging from the oil passage $87_1$ communicates with a jet $90_1$, which is formed in the collar 90, and a jet $87_4$ is formed in the oil passage $87_1$. The jets $90_1$ and $87_4$ are directed to the bearing 7, so that the bearing 7 is lubricated by the lubricating oil ejected from these jets.

As can be seen from FIG. 4, the dynamo 2 accommodated in the dynamo housing 43 includes a stator 97 constituted by winding a coil 95 around an iron core 94, and a rotor 100 constituted by embedding a plurality of permanent magnets 99 into a magnet holder 98. The rotary shaft 8 extending forwards within the compressor wheel 9 and the rotor 100 is formed with a tension bolt, and the rotary shaft 8 and the rotor 100 are coupled to each other by threadedly fitting a nut 101 over a front end of the tension bolt. Specifically, a fastening force of the nut 101 urges the inner race of the bearing 6, a collar 102 and the magnet holder 98 of the rotor 100 rearwards to bring a rear end of the magnet holder 98 into pressure contact with the front end of the compressor wheel 9 to fix it. A bulged portion $8_1$ formed at an intermediate portion of the rotary shaft 8 is put into abutment against an inner surface of the magnet holder 98, thereby bracing the rotary shaft 8.

The bearing 6 supporting the front end of the rotary shaft 8 is disposed within a lubricating oil chamber 104 defined by the front cover 41 and the bearing casing 42, and is lubricated through oil passages $42_1$, and $105_2$ defined in the bearing casing 42 and a bearing holder 105.

Thus, the air drawn from the intake passage 5 and compressed by the compressor wheel 9 is fed via the first compressed-air passage 4 to the plate-type heat exchanger 12, where it is heated by the heat exchange with the high-temperature combustion gas. The compressed air passed through the plate-type heat exchanger 12 flows via the second and third compressed-air passages 21 and 22 to the pre-heater 33, where it is mixed with the fuel injected from the fuel injection nozzle 23. It should be noted that at the start of the gas turbine engine E, the plate-type heat exchanger 12 does not sufficiently function, because no combustion gas flows. Therefore, at the start of the gas turbine engine E, it is necessary to energize the pre-heater 17 mounted between the second and third compressed-air passages 21 and 22 to electrically heat the compressed air, thereby rising the temperature of the compressed air to a catalyst activating temperature or more.

A portion of the air-fuel mixture flowing into the can-type combustor 18 is brought into contact with the catalyst carried in the catalytic combustion zone 19 and burnt by a catalytic reaction, and the remainder of the air-fuel mixture is burnt in a homogeneous manner in the homogeneous combustion zone 20 by the heat of the resulting combustion gas. The combustion gas flows into the combustion gas passage 24 to drive the turbine wheel 10, and is further passed through the oxidizing catalyst 27 and then supplied in that form free of noxious components to the plate-type heat exchanger 12. When the turbine wheel 10 is rotated in this manner, the rotative torque of the turbine wheel 10 is transmitted through the rotary shaft 8 to the compressor wheel 9 and the dynamo 2.

Now, as can be seen from FIG. 1, the members including the compressor wheel 9, the turbine wheel 10, the plate-type heat exchanger 12 and the can-type combustor 18 are disposed axially symmetrically with respect to an axis L extending through the center of the rotary shaft 8. As a result, the flows of the compressed air and the combustion gas in the gas turbine engine E are axially symmetrized and circumferentially uniformized and hence, it is possible to decrease the pressure loss to increase the output power and reduce the specific fuel consumption. The distribution of temperature within the gas turbine engine E is also axially symmetric and hence, the thermal distortion of each member is suppressed to the minimum to assure the smooth rotation of the compressor wheel 9 and the turbine wheel 10 and to effectively prevent damage or the like to the ceramic parts due to a thermal stress. Further, the casings and the ducts can be disposed axially symmetrically and hence, they can be made of a thin material such as a metal plate, thereby not only achieving a reduction in weight, but also decreasing the heat loss at the cold start by a decrease in heat mass to reduce the specific fuel consumption.

The uniformization of the air-fuel ratio and the flow speed in the inlet of the catalytic combustion zone 19 is important for a reduction in amount of noxious components in the combustion gas, but this target can be achieved with the short length of the pre-heating zone 33 by axially symmetrizing the flow of the air-fuel mixture flowing into the pre-mixing zone 33 by the above-described axially symmetric disposition. Further, the uniformization of the flow speeds in the compressed-air inlet 13 and the combustion gas inlet 15 in the plate-type heat exchanger 12 is important for an enhancement of the heat exchange efficiency and a decrease in pressure loss, but this target can be achieved by axially symmetrizing the flows of the compressed air and the combustion gas flowing into the plate-type heat exchanger 12 by the above-described axially symmetric disposition.

In addition, the can-type combustor 18 with a higher temperature is disposed at the center of the gas turbine engine E; the plate-type heat exchanger 12, the second compressed-air passage 21, the third compressed-air passage 22, the turbine wheel 10 and the combustion gas passage 24 with a medium temperature are disposed outside the can-type combustor 18; and the compressor wheel 9 and the first compressed-air passage 4 with a lower temperature are disposed further outside the members with the medium temperature. Therefore, the dissipation of heat to the outside can be reduced to provide a reduction in fuel consumption even if insulation like a ceramic are not used.

Further, the compressor wheel 9, the turbine wheel 10 and the can-type combustor 18 are disposed sequentially from the front to the rear along the axis L, and the circular plate-type heat exchanger 12 is disposed to surround the radially outer portion of the can-type combustor 18. Therefore, a space is defined radially outside the compressor wheel 9 and the turbine wheel 10, and hence, the first compressed-air passage 4, the combustion gas passage 24 and the oxidizing catalyst 27 can be disposed utilizing this space. Thus, the radial dimension of the gas turbine engine E can be reduced, as compared with the case where the first compressed-air passage 4, the combustion gas passage 24 and the oxidizing catalyst 27 are disposed radially inside the plate-type heat exchanger 12.

Figure 8:
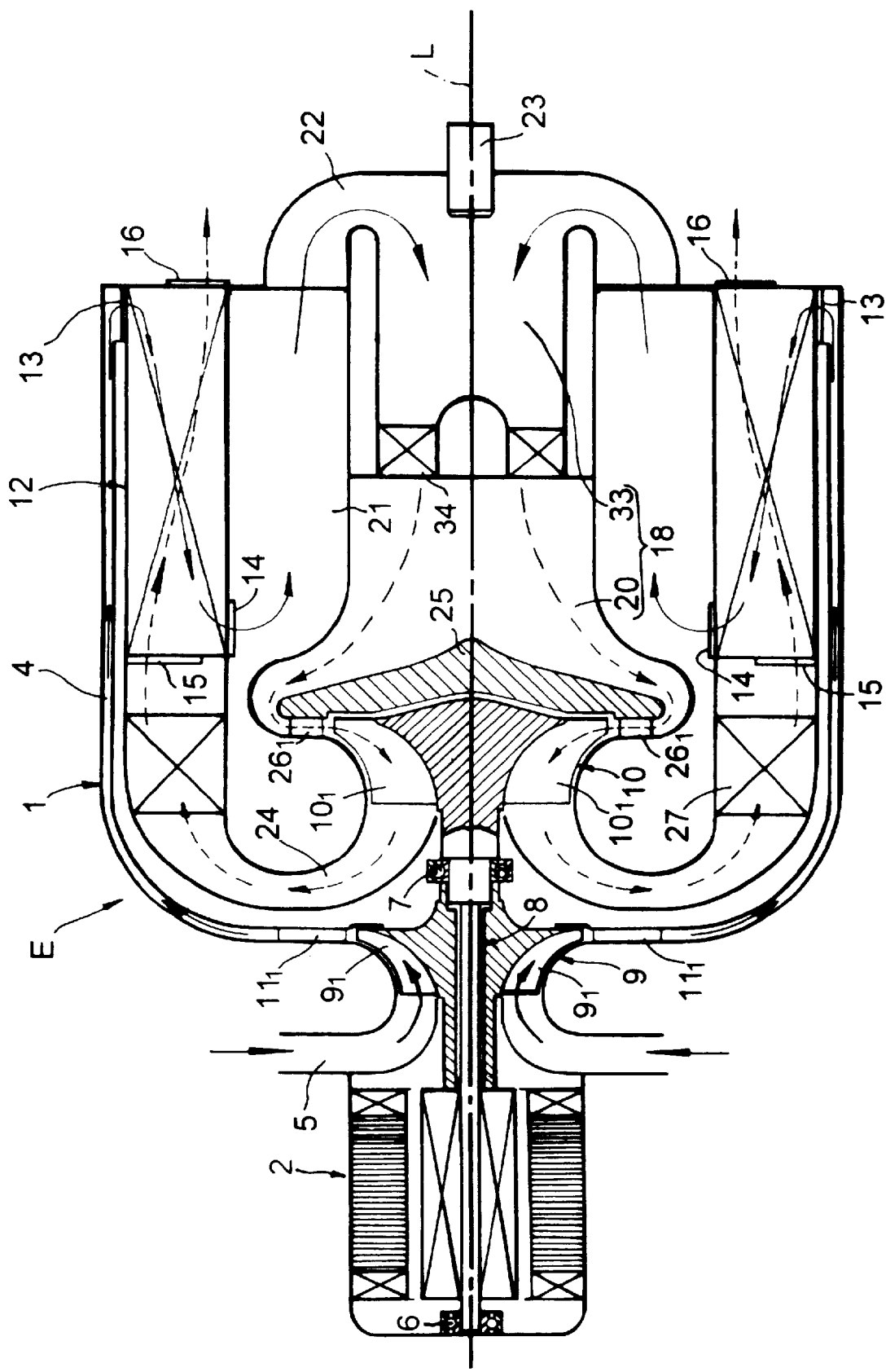
Figure 9:
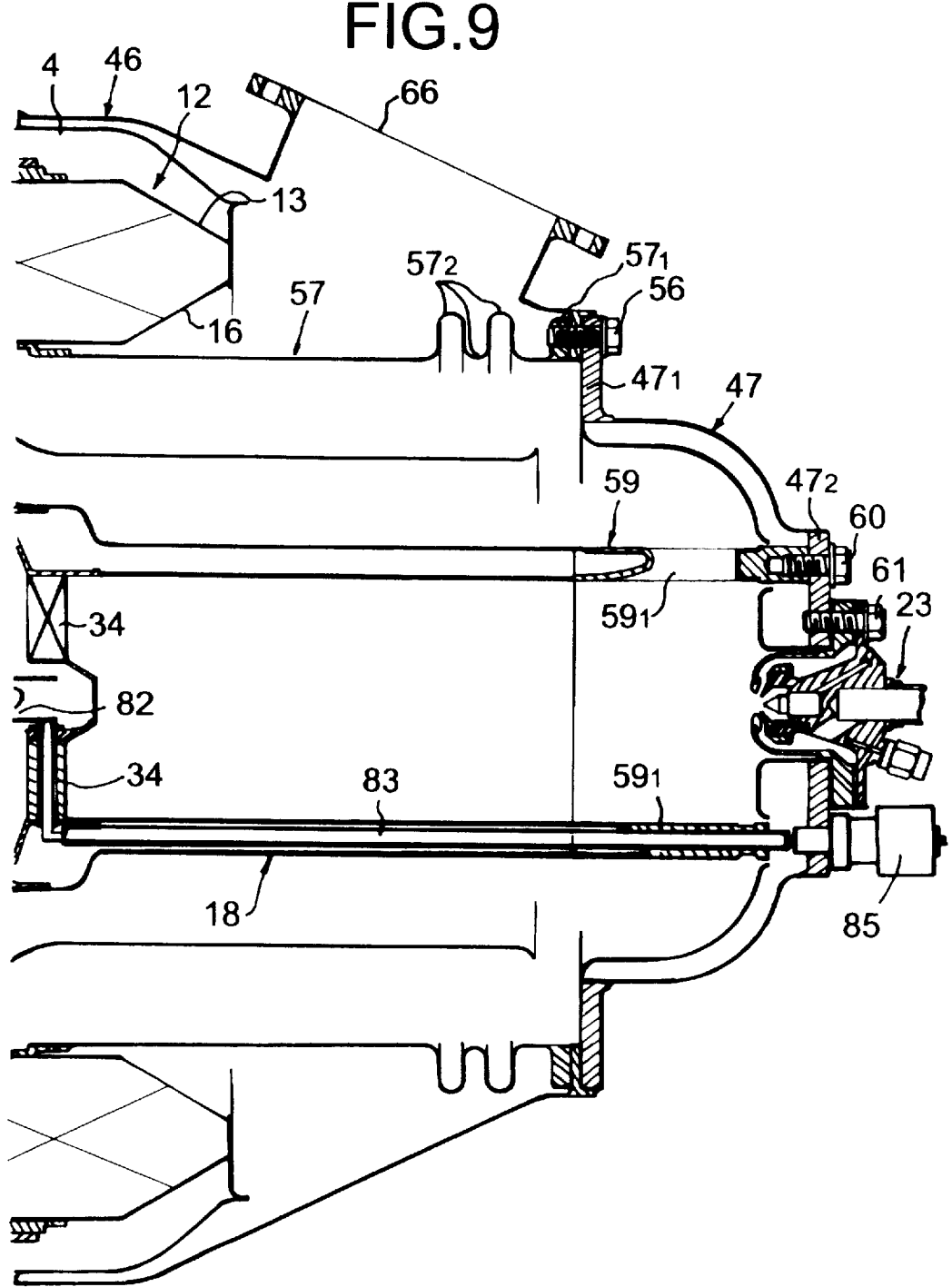

FIGS. 8 and 9 illustrate a second embodiment of the present invention. The second embodiment is different from the first embodiment in respect of the fact that the pre-heater 17 is not mounted in the second embodiment, and in respect of the structure of the can-type combustor 18. The other constructions are the same as in the first embodiment.

The can-type combustor 18 in the second embodiment is comprised of a pre-mixing zone 33, a flame holder zone 34 such as a swirler zone for generating a vortex flow in the air-fuel mixture, and a homogeneous combustion zone 20, and corresponds to a can-type combustor 18 with the catalytic combustion zone 19 provided in the first embodiment being eliminated therefrom. With the second embodiment, the operation of the gas turbine engine E is continued by a flame of the air-fuel mixture being maintained in the flame holder zone 34.

Thus, even in the second embodiment, the members including the compressor wheel 9, the turbine wheel 10, the plate-type heat exchanger 12 and the can-type combustor 18 are disposed axially symmetrically with respect to an axis L extending through the center of the rotary shaft 8 and hence, a function and an effect similar to those in the first embodiment can be provided by axially symmetrizing the flow of the compressed air, the flow of the combustion gas and the distribution of temperature.

Although the embodiments of the present invention have been described in detail, it will be understood that the present invention is not limited to the above-described embodiments, and various modifications in design may be made without departing from the spirit and scope of the invention defined in claims.

What is claimed is:

1. A gas turbine engine comprising a can-type combustor, a compressor wheel for supplying compressed air to the can-type combustor, a turbine wheel driven by a combustion gas generated in the can-type combustor for driving the compressor wheel, and a circular plate-type heat exchanger for conducting a heat exchange between the combustion gas discharged from the turbine wheel and the compressed air supplied to the can-type combustor, wherein said compressor wheel, said turbine wheel, said can-type combustor and said plate-type heat exchanger are disposed coaxially; said plate-type heat exchanger is disposed at a location radially outside said can-type combustor and axially offset from said compressor wheel and said turbine wheel; and a compressed-air passage for guiding the compressed air from said compressor wheel to said plate-type heat exchanger and a combustion gas passage for guiding the combustion gas from said turbine wheel to said plate-type heat exchanger are disposed radially outside said compressor wheel and said turbine wheel.

2. A gas turbine engine according to claim 1, further including an oxidizing catalyst incorporated in said combustion gas passage.

3. A gas turbine engine according to claim 1, wherein the compressed air and the combustion gas flow in opposite directions with respect to each other within said plate-type heat exchanger.

4. A gas turbine engine according to claim 1, wherein said can-type combustor includes a pre-mixing zone, a catalytic combustion zone, and a homogeneous combustion zone.

5. A gas turbine engine according to claim 1, wherein said can-type combustor includes a pre-mixing zone, a flame holder zone, and a homogeneous combustion zone.

6. A gas turbine engine according to claim 1, further including a pre-heating means incorporated in the compressed-air passage which connects the plate-type heat exchanger and the can-type combustor.

* * * * *